March 4, 1958 R. T. SCOTT 2,825,228
INERTIAL APPARATUS
Filed March 1, 1957

INVENTOR.
ROBERT T. SCOTT
BY Roger W. Jensen
ATTORNEY

United States Patent Office 2,825,228
Patented Mar. 4, 1958

2,825,228

INERTIAL APPARATUS

Robert T. Scott, Minneapolis, Minn., assignor to Minneapolis-Honeywell Regulator Company, Minneapolis, Minn., a corporation of Delaware Application March 1, 1957, Serial No. 643,469

6 Claims. (Cl. 74—5.5)

This invention pertains generally to the field of inertial instruments such as gyroscopes and more specifically to the field of floated inertial instruments. One type of floated instrument is a floated gyroscope of the type shown in the J. J. Jarosh et al. Patent 2,752,791. Floated gyroscopes are in wide spread use at the present time and generally comprise a housing, a gimbal or chamber mounted within the housing, support means supporting a gimbal in the housing for rotation relative to the housing about an axis which is usually identified as the output axis, a gyroscope or other inertial element within the chamber or gimbal, and a fluid for floating the gimbal assembly in substantially neutral suspension. Since the fluid supports substantially all of the weight of the gimbal very little loading is placed on the bearing means that support the gimbal and accordingly the bearing means may be made very delicate and for all practical purposes frictionless. The fluid supporting the gimbal also acts as a viscous restraint against rotation of the gimbal assembly about its output axis. The viscous fluid also serves as an integration means as well understood by those skilled in the art. To explain, a floated gyroscope in one of its applications responds to angular rate of change of the gyroscope about the gyro input axis (the gyro input axis being perpendicular to both the gyro spin axis and the gyro output axis). The response of the gyro to angular rate of change of the device about the input axis results in precession of the gimbal assembly about the output axis. As the gimbal rotates about the output axis the viscous fluid performs an integrating function so that the total displacement of the gimbal about its output axis is a measure of the time integral of said angular rate of change, and hence measures the total angular displacement about the input axis.

Floated gyroscopes are extremely accurate devices due to the fact that they may utilize delicate bearings for supporting the gimbal assembly. However, in order to provide accuracy in integrating it is necessary to maintain the viscous fluid at the proper temperature. The gyro fluids are very temperature sensitive in that their viscosity changes considerably with variations in temperature. Accordingly, in prior art gyros such as that shown in the referenced Jarosh patent, it has been found necessary to provide heating means for maintaining the fluid at the desired temperature and providing thermostatic control means for regulating the heating means.

Another characteristic of the viscous fluids used in floated gyroscopes is that they have poor thermal conductivity. In the prior art heating systems for floated gyroscopes the heat has been applied to the exterior of the gyro housing and is slowly transmitted to the interior of the gyro in part by the viscous fluid and in part by various other heat flow paths. It is obvious that the gyro will not give accurate information until all of the fluid in the gyro is at the desired temperature. In many applications the gyro initially is at a very low ambient temperature and in these cases it takes a considerable length of time to bring the gyro up to the desired operating temperature and it follows that in many cases the length of time required is objectionable.

The present invention is concerned with a unique placement of heating means within the floated gyroscope which greatly reduces the length of time required to bring the gyro up to the desired operating temperature. The present invention utilizes the electromagnetic torquers and signal generators generally used in floated gyroscopes. These electromagnetic devices are of the type shown in the Mueller Patents 2,488,734; 2,596,711; and 2,596,712. These torquers and signal generators are known in the art as "microsyns" and generally comprise a stator section having a plurality of inwardly extending pole pieces, coil means on said inwardly extending pole pieces, which together with the pole pieces define a generally square aperture. An armature or rotor member for each electromagnetic device is mounted on the gimbal assembly and positioned adjacent to the stator member and within said square aperture. The rotor members generally have a circular central section with a pair of projecting pole pieces that are diammetrically opposite to one another. The rotors are generally oriented relative to the stator members when in their normal position so that the pole portions on the rotors are lying intermediate to the pole portions of the stator. The fluid surrounding the gimbal assembly of course surrounds the rotor member of the electromagnetic devices and fills the square aperture defined by the coil means and pole pieces of the stator member of the electromagnetic devices.

The present invention utilizes the void spaces defined between the rotor and stator of the electromagnetic torquers and signal generators of the type described, said void spaces being an inherent feature of the described construction. According to the present invention, special heating elements are mounted on the coil means within the aperture defined and are located in the corners of said aperture. By locating the heaters in these locations, advantage is taken of otherwise unused space and further and of more importance the heat developed or dissipated by these heaters is produced near the interior of the gyro where it is especially needed in contrast to the prior art heating arrangements where the heat is applied externally of the gyro and is slowly transmitted to the interior of the gyro through the fluid which, as indicated above, is a poor conductor of heat. Further, the heaters tend to displace a certain portion of the viscous liquid and hence reduce the total amount of liquid to be heated.

It is an object of this invention, therefore, to provide an improved floated instrument.

Other objects of the invention will become more apparent from a reading of the following specification and appended claims, in conjunction with the accompanying drawing in which:

Figure 1:
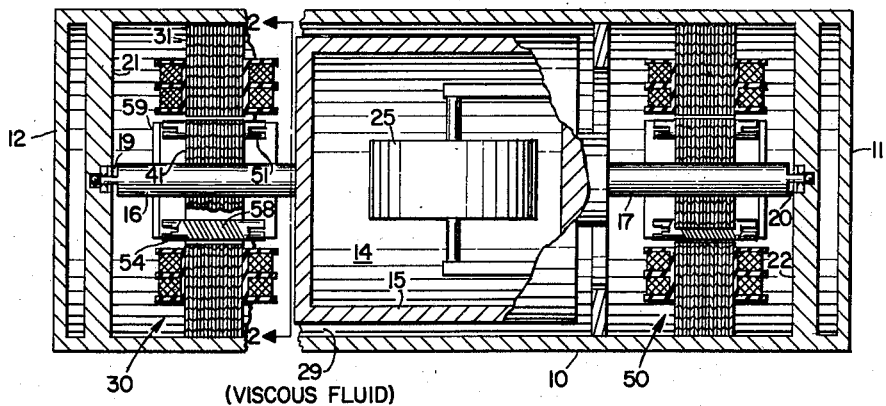
Figure 1 is a cross sectional view of a floated gyroscope embodying my invention.

Referring to Figure 1, numeral 10 depicts the housing of a floated gyroscope, housing 10 being a generally hollow cylindrical member having end portions 11 and 12 thereon. A gimbal or chamber assembly 14 comprising a generally hollow cylindrical chamber 15 is positioned within housing or case 10. A pair of shaft members 16 and 17 are integral with gimbal chamber 15 and have end portions thereon which cooperate with bearing means 19 and 20 located in partitions 21 and 22 of housing 10 for supporting gimbal assembly 14 for rotation about an output axis defined by bearings 19 and 20.

Figures 2, 3:
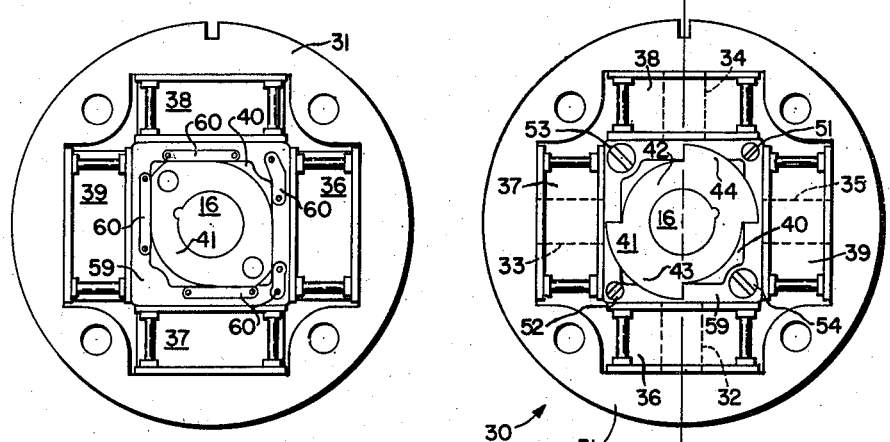
Figure 2 is a view of an electromagnetic device used in the gyro of Figure 1 as viewed along section lines 2—2.
Figure 3 is a back view of the electromagnetic device shown in Figure 2.
Figure 4:
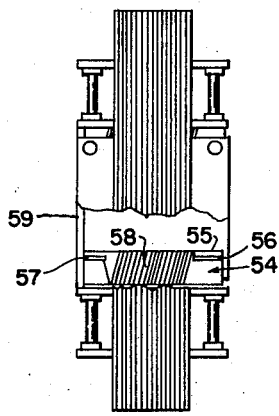
Figure 4 is a side view of the electromagnetic device shown in Figures 2 and 3.

A gyroscope or inertial element 25 is shown schematically and is positioned within the gimbal or chamber 15. Suitable means, not shown, are provided for causing the rotor element of the gyroscope 25 to rotate. An electromagnetic torquer and signal generator 30 and 50 respectively are mounted within housing 10 of the gyroscope. Torquer and signal generator 30 and 50 are are the general type described in the above mentioned Mueller patents. Torquer 30 and signal generator 50 are of the same general configuration and torquer 30 is shown in greater detail in Figures 2, 3 and 4. Torquer 30 comprises a stator member 31 having a generally circular yoke section with four inwardly extending pole portions 32, 33, 34 and 35. A plurality of coil means 36, 37, 38 and 39 are mounted on pole portions 32, 33, 34 and 35, respectively. The inner surfaces of the pole portions 32 to 35 and/or coil means 36 to 39 tend to define a generally square aperture 40. A rotor member 41 is mounted on shaft portion 16 of the gimbal assembly 14 and comprises a general circular central portion 42 with a pair of poles or projections 43 and 44 thereon which are diametrically opposed to one another. Gimbal assembly 14 has a normal position relative to housing 10 which corresponds to the rotor member 41 of the torquer 30 being oriented relative to stator member 31 so that poles 43 and 44 on rotor 41 are intermediate or equidistant from the adjacent poles of stator 31. As shown in Figure 2 pole 43 of rotor 41 is intermediate poles 32 and 33 of stator 31 and pole 44 of rotor 41 is intermediate poles 34 and 35 of stator 31. It may also be stated that the poles 43 and 44 on rotor 41 tend to be aligned with a line joining diagonal corners of the generally square aperture 40 defined by the coil means 36-39 and/or pole portions 32 to 35.

Viscous fluid 29 fills housing 10 and surrounds the gimbal assembly 14 including rotor 41 in aperture 40 supporting the assembly in substantially neutral suspension.

It will be noted that the relationship between rotor 41 and stator 31 of the torquer 30 and the physical shapes thereof are such that certain portions of the square aperture 40 are not utilized. The corners of the square aperture in line with poles 43 and 44 of rotor 41 have positioned therein heater means 51 and 52 which are generally cylindrical bobbin members with a resistance winding thereon and are fastened to the coil means 36-39 by suitable means such as an adhesive, not shown. The other corners of the square aperture 40 have larger heaters 53 and 54 positioned therein. Heaters 53 and 54 may be of a larger diameter than heaters 51 and 52 due to the fact that there is more space in these corners than in the other two corners. Accordingly, heaters 53 and 54 can have a greater power dissipation area. Heater 54 is shown in greater detail in Figure 4. Heater 54 comprises a cylindrical bobbin member 55 having slots 56 and 57 in opposite ends thereof. A resistance winding 58 is wound about bobbin 55 and the ends of the winding 58 are connected through slots 56 and 57 to a special connection board 59 shown best in Figure 3. Connection board 59 has a plurality of metalized portions 60 thereon which are used for making interconnections between the various heaters 51, 52, 53 and 54. Generally connection board 59 is of an insulative material with the exception of the metalized portions 60.

Operation

The heaters 51, 52, 53 and 54 provided by the present invention generally will be used in connection with heating means of the type (not shown in the present application) shown in the above referenced Jarosh patent. Thermostatic means (not shown) control the energization of heaters 51-54 from a source of power (not shown). The viscous fluid 29 which surrounds gimbal assembly 14 is heated in part by the prior art heaters positioned external of housing 10. These prior art heaters, however, are inefficient for transmitting heat into the viscous fluid 29 in the zone of the microsyn rotors. The heaters 51-54 provided by the present invention when energized dissipate heat to the viscous fluid 29 in the zone of the rotors of the microsyns and hence tend to greatly reduce the length of time required to bring the gyro fluid up to the desired operating point. It will be appreciated that the heaters 51-54 utilize space inherently provided by the construction of the microsyn type electromagnetic devices, space that previously had not been used. Also, the heaters 51-54 displace a certain amount of viscous fluid and thus reduce the total amount of fluid needed to be heated.

No specific description has been made of the heating means associated with the signal generator 50 since the details thereof are substantially identical to the heating means on the torquer 30.

While I have shown and described a specific embodiment of this invention, further modifications and improvements will appear to those skilled in the art. I desire it to be understood therefore, that this invention is not limited to the particular form shown and I intend in the appended claims to cover all modifications which do not depart from the spirit and scope of this invention.

What I claim is:

1. In a floated gyroscope: a housing member; a chamber in said housing; a gyroscope in said chamber; means supporting said chamber in said housing for rotation about an axis; a viscous fluid filling said housing member and surrounding said chamber; a stator member of an electromagnetic device mounted in said housing and comprising a plurality of inwardly extending pole pieces; coil means on said pole pieces, said coil means and said pole pieces defining a square aperture; an elongated rotor member of an electromagnetic device mounted on said chamber and positioned adjacent said coil means and within said square aperture; and means for heating the fluid adjacent to said rotor comprising a first pair of heaters mounted on said stator member within said square aperture and in two diagonally opposite corners thereof, a second pair of heaters mounted on said stator member within said square aperture in the other two corners thereof, and means for energizing said heaters from a source of power, said first pair of heaters being larger than said second pair of heaters.

2. In a floated gyroscope: a housing member; a chamber in said housing; a gyroscope in said chamber; means supporting said chamber in said housing for rotation about an axis; a viscous fluid filling said housing member and surrounding said chamber; a stator member of an electromagnetic device mounted in said housing and comprising a plurality of inwardly extending pole pieces; coil means on said pole pieces, said coil means and said pole pieces defining a square aperture; a rotor member of an electromagnetic device mounted on said chamber for rotation therewith and positioned adjacent said coil means and within said square aperture; and means for heating the fluid adjacent to said rotor comprising a first pair of heaters mounted on said stator member within said square aperture and in two diagonally opposite corners thereof, a second pair of heaters mounted on said stator member within said square aperture in the other two corners thereof, and means for energizing said heaters from a source of power.

3. In a floated inertial instrument: a housing member; a hollow chamber in said housing; an inertial element in said chamber; means supporting said chamber in said housing for rotation about an axis; viscous fluid in and filling said housing member and surrounding said chamber; a stator member of an electromagnetic device mounted in said housing and comprising a plurality of inwardly extending pole pieces; coil means on said pole pieces, said coil means and said pole pieces defining an aperture; a rotor member of an electromagnetic device positioned adjacent said coil means and within said aperture; and means for heating said fluid adjacent to said rotor comprising a plurality of heaters positioned within said aperture and means for energizing said heaters from a source of power.

4. In a floated inertial instrument: a housing member; a chamber in said housing; an inertial element in said chamber; means supporting said chamber in said housing for rotation about an axis; a viscous fluid filling said housing member and surrounding said chamber; a stator member of an electromagnetic device mounted in said housing and comprising four inwardly extending pole pieces; coil means on said pole pieces, said coil means and said pole pieces defining a square aperture; a rotor member of an electromagnetic device mounted on said chamber for rotation therewith and positioned adjacent said coil means and within said square aperture; and means for heating the fluid adjacent to said rotor comprising a plurality of heaters mounted on said coil means within said square aperture and in the corners of said aperture.

5. In a floated gyroscope: a housing member; a chamber in said housing; a gyroscope in said chamber; means supporting said chamber in said housing for rotation about an axis; a viscous fluid filling said housing member and surrounding said chamber; a stator member of an electromagnetic device mounted in said housing and comprising a plurality of inwardly extending pole pieces; coil means on said pole pieces, said coil means and said pole pieces defining a square aperture; a rotor member of an electromagnetic device mounted on said chamber for rotation therewith and positioned adjacent said coil means and within said square aperture, said rotor member having a general circular central section and a pair of diametrically opposed projecting pole portions, and said rotor member being normally positioned relative to said stator member and said coil means so that said pole portions of said rotor normally lie on a line connecting two diagonally located corners of said square aperture; and means for heating the fluid adjacent to said rotor comprising a first pair of heaters mounted on said coil means within said aperture and in said two diagonally opposite corners thereof, a second pair of heaters mounted on said coil means within said aperture in the other two corners thereof, and means for energizing said heaters from a source of power, said second pair of heaters being larger than said first pair of heaters.

6. In a floated inertial instrument: a housing member; a chamber in said housing; an inertial element in said chamber; means supporting said chamber in said housing for rotation about an axis; a viscous fluid filling said housing member and surrounding said chamber; a stator member of an electromagnetic device mounted in said housing and comprising a plurality of inwardly extending pole pieces; coil means on said pole pieces, said coil means and said pole pieces defining a square aperture; a rotor member of an electromagnetic device mounted on said chamber for rotation therewith and positioned adjacent said coil means and within said square aperture, said rotor member having a general circular central section and a pair of diametrically opposed projecting pole portions, and said rotor member being normally positioned relative to said stator member and said coil means so that said pole portions of said rotor normally lie on a line connecting two diagonally located corners of said square aperture; and means for heating the fluid adjacent to said rotor comprising a plurality of heaters mounted on said coil means within said aperture and in the corners thereof, and means for energizing said heaters from a source of power.

No reference cited.